United States Patent
Fix et al.

(10) Patent No.: US 8,929,827 B2
(45) Date of Patent: Jan. 6, 2015

(54) ADAPTIVE CALIBRATION OF MEASUREMENTS FOR A WIRELESS RADIO NETWORK

(75) Inventors: Jeremy Fix, Acworth, GA (US); Francisco Martinez, Cumming, GA (US); Sheldon Kent Meredith, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 164 days.

(21) Appl. No.: 13/488,144

(22) Filed: Jun. 4, 2012

(65) Prior Publication Data

US 2013/0324149 A1    Dec. 5, 2013

(51) Int. Cl.
H04W 24/00    (2009.01)
H04B 1/00    (2006.01)
H04B 15/00    (2006.01)
H04B 1/56    (2006.01)

(52) U.S. Cl.
USPC ..................... 455/63.1; 455/456.1; 370/252

(58) Field of Classification Search
CPC .................................................. H04W 24/00
USPC ............. 455/41.2, 456.1, 63.1; 370/252, 328, 370/241
See application file for complete search history.

(56) References Cited

U.S. PATENT DOCUMENTS

| | | | |
|---|---|---|---|
| 5,515,062 A | 5/1996 | Maine et al. | |
| 5,724,660 A | 3/1998 | Kauser et al. | |
| 5,732,354 A | 3/1998 | MacDonald | |
| 5,732,383 A | 3/1998 | Foladare et al. | |
| 5,844,521 A | 12/1998 | Stephens et al. | |
| 5,982,324 A | 11/1999 | Watters et al. | |
| 6,018,312 A | 1/2000 | Haworth et al. | |
| 6,108,532 A | 8/2000 | Matsuda et al. | |
| 6,108,556 A | 8/2000 | Ito | |
| 6,148,219 A | 11/2000 | Engelbrecht et al. | |
| 6,256,577 B1 | 7/2001 | Graunke | |
| 6,263,190 B1 | 7/2001 | Mamori et al. | |
| 6,298,233 B1 | 10/2001 | Souissi et al. | |

(Continued)

FOREIGN PATENT DOCUMENTS

| | | |
|---|---|---|
| EP | 0856746 A2 | 8/1998 |
| JP | 2004069609 | 3/2004 |
| JP | 2007328050 A | 12/2007 |
| WO | 2006031035 A1 | 3/2006 |

OTHER PUBLICATIONS

Final Office Action dated Jan. 25, 2013, for U.S. Appl. No. 13/554,285, 20 pages.

(Continued)

Primary Examiner — Opiribo Georgewill
(74) Attorney, Agent, or Firm — Amin, Turocy & Watson, LLP

(57) ABSTRACT

Adaptive calibration of measurements for a wireless radio network is described. A network location system can employ timed fingerprint location technology to determine location information for UEs in a NELOS enabled wireless network environment. Calibration of observed time measurements can reduce errors in determining location information. Adaptive calibration facilitates the selection of subsets of wireless network radios for calibration updates. The selection of wireless network radios comprising the subsets can be based on prioritization rules including prioritization based on historical calibration information, geographic information, or observation density information for a wireless network radio. Further, a wireless network radio can be deprioritized based on the availability of alternate location information related to the wireless network radio.

20 Claims, 10 Drawing Sheets

(56) References Cited

U.S. PATENT DOCUMENTS

| | | |
|---|---|---|
| 6,307,503 B1 | 10/2001 | Liu et al. |
| 6,311,078 B1 | 10/2001 | Hardouin et al. |
| 6,317,686 B1 | 11/2001 | Ran |
| 6,330,459 B1 | 12/2001 | Chrichton et al. |
| 6,353,778 B1 | 3/2002 | Brown et al. |
| 6,397,074 B1 | 5/2002 | Pihl et al. |
| 6,407,703 B1 | 6/2002 | Minter et al. |
| 6,429,815 B1 | 8/2002 | Soliman |
| 6,453,168 B1 | 9/2002 | McCrady et al. |
| 6,526,335 B1 | 2/2003 | Treyz et al. |
| 6,560,532 B2 | 5/2003 | Cayford |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,801,782 B2 | 10/2004 | McCrady et al. |
| 6,801,855 B1 | 10/2004 | Walters et al. |
| 6,816,782 B1 | 11/2004 | Walters et al. |
| 6,892,054 B2 | 5/2005 | Belcher et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,366,492 B1 | 4/2008 | Ganesh |
| 7,375,649 B2 | 5/2008 | Gueziec |
| 7,432,829 B2 | 10/2008 | Poltorak |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 8,036,822 B2 | 10/2011 | Ho et al. |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,307,030 B1 | 11/2012 | Hu |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,666,388 B2 | 3/2014 | Catovic et al. |
| 8,666,390 B2 | 3/2014 | Meredith et al. |
| 2001/0047242 A1 | 11/2001 | Ohta |
| 2002/0059266 A1 | 5/2002 | I'anson et al. |
| 2002/0077116 A1 | 6/2002 | Havinis et al. |
| 2003/0092448 A1 | 5/2003 | Forstrom et al. |
| 2003/0097330 A1 | 5/2003 | Hillmer et al. |
| 2003/0115260 A1 | 6/2003 | Edge |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0224698 A1 | 11/2004 | Yi et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0270419 A1 | 11/2006 | Crowly et al. |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0039114 A1 | 2/2008 | Phatak et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0311923 A1 | 12/2008 | Petrovic et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren |
| 2009/0131073 A1 | 5/2009 | Carlson et al. |
| 2009/0181695 A1 | 7/2009 | Wirola et al. |
| 2009/0260055 A1 | 10/2009 | Parmar |
| 2009/0280828 A1 | 11/2009 | Wang et al. |
| 2009/0287922 A1 | 11/2009 | Herwono et al. |
| 2009/0310501 A1 | 12/2009 | Catovic et al. |
| 2009/0327134 A1 | 12/2009 | Carlson et al. |
| 2010/0058442 A1 | 3/2010 | Costa et al. |
| 2010/0100732 A1 | 4/2010 | Hatakeyama et al. |
| 2010/0120447 A1 | 5/2010 | Anderson et al. |
| 2010/0135178 A1* | 6/2010 | Aggarwal et al. ............. 370/252 |
| 2010/0159951 A1 | 6/2010 | Shkedi et al. |
| 2010/0172259 A1* | 7/2010 | Aggarwal et al. ............. 370/252 |
| 2010/0189236 A1 | 7/2010 | MacDonald et al. |
| 2010/0190509 A1 | 7/2010 | Davis et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0227589 A1 | 9/2010 | Cook et al. |
| 2010/0250542 A1 | 9/2010 | Fujimaki |
| 2010/0299060 A1 | 11/2010 | Snavely et al. |
| 2011/0010085 A1 | 1/2011 | Tanaka et al. |
| 2011/0060808 A1 | 3/2011 | Martin et al. |
| 2011/0065450 A1 | 3/2011 | Kazmi |
| 2011/0072034 A1 | 3/2011 | Sly |
| 2011/0076975 A1 | 3/2011 | Kim et al. |
| 2011/0077032 A1 | 3/2011 | Correale et al. |
| 2011/0161261 A1 | 6/2011 | Wu et al. |
| 2011/0164596 A1 | 7/2011 | Montemurro et al. |
| 2011/0172905 A1 | 7/2011 | Schroder et al. |
| 2011/0205964 A1 | 8/2011 | Fix et al. |
| 2011/0207470 A1* | 8/2011 | Meredith et al. ........... 455/456.1 |
| 2011/0244879 A1 | 10/2011 | Siomina et al. |
| 2011/0271331 A1 | 11/2011 | Adams |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0158289 A1 | 6/2012 | Bernheim Brush et al. |
| 2012/0182874 A1* | 7/2012 | Siomina et al. ............... 370/241 |

(56) References Cited

U.S. PATENT DOCUMENTS

| | | |
|---|---|---|
| 2012/0323703 A1 | 12/2012 | Hillier et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |
| 2013/0281111 A1 | 10/2013 | Syrjarinne et al. |
| 2013/0324149 A1 | 12/2013 | Fix et al. |
| 2014/0062782 A1 | 3/2014 | Abraham |
| 2014/0171060 A1 | 6/2014 | Cook et al. |

OTHER PUBLICATIONS

Non-Final Office Action dated Mar. 19, 2013, for U.S. Appl. No. 13/174,541, 46 pages.
Final Office Action dated Feb. 13, 2013, for U.S. Appl. No. 13/220,083, 48 pages.
Final Office Action dated Feb. 22, 2013, for U.S. Appl. No. 13/188,345, 45 pages.
Final Office Action dated Mar. 15, 2013, for U.S. Appl. No. 13/204,535, 18 pages.
Non-Final Office Action dated Mar. 19, 2013, for U.S. Appl. No. 13/284,497, 46 pages.
Non-Final Office Action dated Apr. 19, 2013, for U.S. Appl. No. 13/277,595, 58 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
Bitcarrier Technology. Published online at http://www.bitcarrier.com/technology. 1 page.
Hao Peng, Ban Xuegang(Jeff). Estimating Vehicle Position in a Queue at Signalized Intersections Using Simple Travel Times from Mobile Sensors. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
OA dated Apr. 13, 2012 for U.S. Appl. No. 12/416,853, 36 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013, for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.
Sullivan, Mark. "Signs and Wonders: Is At&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.

(56) References Cited

OTHER PUBLICATIONS

"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages."

"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec 24, 2010, 16 pages."

"Drucker, et al. Support Vector Regression Machines.http://scholar.google.com/scholar?q=%22Support+Vector+Regression+Machines.%22. Last accessed Dec. 24, 2010, 7 pages."

Suykens et al., "Least squares support vector machine classifiers", Neural Processing Letters, vol. 9, No. 3, Jun. 1999, pp. 293-300.

Ferris et al. (2002). "Interior-point methods for massive support vector machines". SIAM Journal on Optimization 13: 783-804. doi:10.1137/S1052623400374379.

Meyer et al. "The support vector machine under test." Neurocomputing 55(1-2): 169-186, 2003.

International Search Report for PCT Application No. US2011/026122 Sep. 10, 2011, 11 pages.

International Search Report for PCT Application No. US2011/026120 dated Sep. 9, 2011 13 pages.

Charitanetra et al. "Mobile positioning location using E-OTD method for GSM network" Research and Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-. . . 1&ct=clnk, Oct. 12, 2010.

"Location Based Fraud Detection", Finsphere Corporation, 2008-2010.

Fleishman. Using the Personal Hotspot on your AT & T iPhone. Published online Mar. 15, 2011. http://www.macworld.com/article/158556/2011/03/personal_hotspot_att . . . , 4 pages.

Fleischfresser. Never Stop at a Red-Light Again. Published online Aug. 30, 2011. http://www.smartplanet.com/blog/ . . . , 2 pages.

Cellphone Networks and the Future of Traffic. Published online Mar. 2, 2011. http://m.wired.com/autopia/2011/03/cell-phone-networks-and-the-future- . . . 15 pages.

Intelligent Transportation System. Published online http://en.wikipedia.org/wiki/Intelligent_transportation_system, 7 pages.

Koukoumidis Emmanouil, Peh Li-Shiuan, Martonosi Margaret, SignalGuru: Leveraging Mobile Phones for Collaborative Traffic Signal Schedule Advisory. 14 pages.

Office Action dated Apr. 23, 2014 for U.S Appl. No. 13/291,917, 29 pages.

Office Action dated Apr. 22, 2014 for U.S. Appl. No. 13/447,069, 51 pages.

Office Action dated Jun. 30, 2014 for U.S. Appl. No. 13/305,267, 44 Pages.

Office Action dated May 14, 2014 for U.S. Appl. No. 13/660,689, 62 pages.

Office Action dated May 9, 2014 for U.S. Appl. No. 13/188,136, 33 pages.

Squires, "Practical Physics", Cambridge University Press, p. 12, 1986, retrieved on May 9, 2014, 3 pages.

Represent (2000). In Collins English dictionary. Retrieved on May 9, 2014 from http://search.credoreference.com/content/entry/hcengdict/represent/0, 2 pages.

Represent. (2001). In Chambers 21 st century dictionary. Retrieved on May 9, 2014 from http://search.credoreference.com/content/entry/chambdict/represent/O.

Represent. (2011). In The american heritage dictionary of the english language. Retrieved on May 9, 2014 from http://search.credoreference.com/content/entry/hmdictenglang/represent/0.

Non-Final Office Action dated May 20, 2014 for U.S. Appl. No. 13/551,369, 29 pages.

Non-Final Office Action dated May 30, 2014 for U.S. Appl. No. 13/277,595, 49 pages.

Non-Final Office Action dated Jun. 3, 2014 for U.S. Appl. No. 13/523,770, 53 pages.

Non-Final Office Action dated Jun. 6, 2014 for U.S. Appl. No. 13/447,072, 25 pages.

Office Action dated Jun. 18, 2014 for U.S. Appl. No. 13/305,276, 26 Pages.

Office Action dated Jun. 26, 2014 for U.S. Appl. No. 13/557,425, 24 Pages.

Notice of Allowance dated Jul. 7, 2014 for U.S. Appl. No. 13/188,295, 51 pages.

Office Action dated Jul. 22, 2014 for U.S. Appl. No. 12/958,146, 38 Pages.

Notice of Allowance dated Jul. 22, 2014 for U.S. Appl. No. 13/525,065, 82 Pages.

Notice of Allowance dated Jul. 22, 2014 for U.S. Appl. No. 13/188,300, 49 Pages.

Office Action dated Aug. 8, 2014 for U.S. Appl. No. 13/284,497, 48 pages.

Office Action dated Aug. 11, 2014 for U.S. Appl. No. 14/279,176, 22 pages.

Notice of Allowance dated Aug. 21, 2014 for U.S. Appl. No. 13/447,069, 78 pages.

Office Action dated Aug. 28, 2014 for U.S. Appl. No. 13/526,988, 83 pages.

Office Action dated Sep. 22, 2014 for U.S. Appl. No. 13/175,199, 62 pages.

\* cited by examiner

ADAPTIVE CALIBRATION OF MEASUREMENTS FOR A WIRELESS RADIO NETWORK

TECHNICAL FIELD

The disclosed subject matter relates to wireless radio network calibration, e.g., calibration of a measurement for a wireless radio network.

BACKGROUND

In mobile equipment networks, locating user equipments (UEs) can provide valuable additional benefits to users and opportunities for additional or improved services. Locating UEs in a wireless network can facilitate providing location-centric services or information in relation to the UE, such as E911 services, mapping services, or traffic information services, among many others. Additionally, UE location information can be employed to improve network performance, to troubleshoot networks, by law enforcement, to aggregate valuable demographic information, or nearly a limitless number of other uses. Such additional usage of UE location data can proactively include removal or obfuscation of identifying information at various levels to address privacy concerns. Network timing delays include site timing delay in the wireless signal path among radio component(s) at the wireless base station and a sector antenna. Network timing delays further include delays that can arise from various mismatches (e.g., impedance mismatch) among electronic elements and components, stray capacitances and inductances, length of the antenna(s) cable(s) in base station(s); tower height of base station, signal path scattering, or "signal bounces," such as multipath or strong reflections, and the like. Propagation delay between a UE and a NodeB is conventionally assumed to be negligible with respect to timing delay. However, depending on the architecture of the serving base station and covered sector antenna(s) signal propagation delay can be non-negligable, particularly in distributed antenna systems and low-power wireless radio cells and cause error in UE location determinations for traditional methods.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system can include a processor and memory. The processor can facilitate the execution of computer-executable instructions stored on the memory. The processor can facilitate execution of the computer-executable instructions to determine calibration update information related to a time measurement for a radio link between a wireless network radio and a user equipment. The determination of the calibration update information can be based in part on radio information and alternate location information.

In another embodiment, a method can include determining, by a system including at least one processor, calibration update information. The calibration update information can be related to a time measurement for a radio link between a wireless network radio and a user equipment. The determination of the calibration update information can be based in part on radio information and alternate location information.

In a further embodiment, a mobile device can include a memory storing computer-executable instructions and a processor that facilitates execution of the computer-executable instructions. The processor can facilitate execution of the computer-executable instructions to determine calibration update information related to a time measurement for a radio link between a wireless network radio and a user equipment. The determination of the calibration update information can be based in part on radio information and alternate location information. Further, a set of calibration candidates can be determined. The set of calibration candidates can include a radio identification for a calibration candidate and a calibration score associated with the radio identification, the calibration score employable to rank, by calibration priority, the calibration candidate against the wireless network radio.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the drawings.

DETAILED DESCRIPTION

Figure 1:
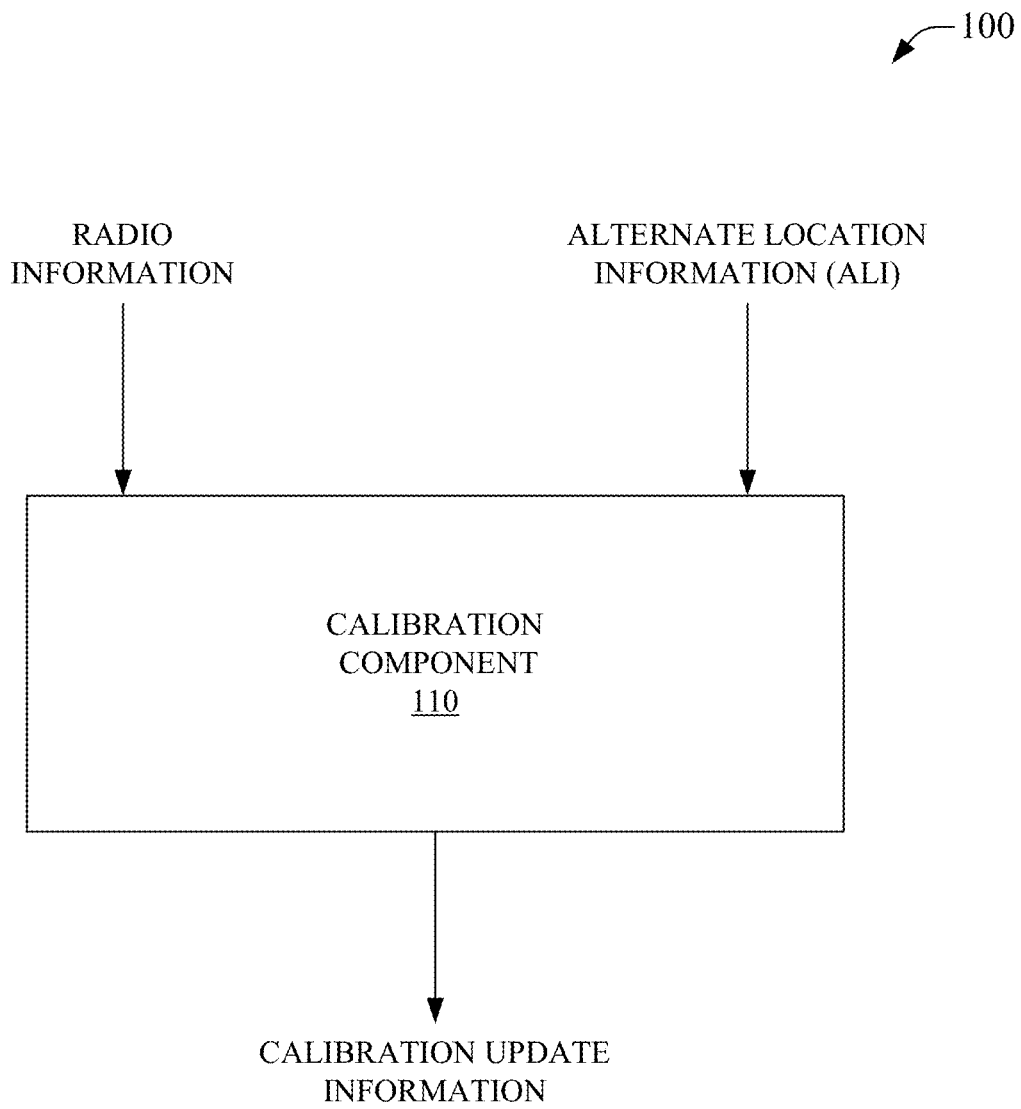
FIG. 1 is an illustration of a system that facilitates adaptive calibration in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

By way of brief background, a network locating system (NELOS, see timed fingerprint location (TFL) as disclosed in U.S. patent application Ser. No. 12/712,424) facilitates determining location information based, in part, on receiving timing measurements between at least a pair of radios and a device. In an aspect, determining location information in a NELOS-enabled system (e.g., a system employing TFL) benefits from calibration of one or more timing measurements for a radio link with a device, e.g., timing measurements associated with radio links between a NodeB site pair (NBSP) and a mobile device. Calibration of those timing measurements generally employs location information from alternate sources, e.g., AGPS, traditional triangulation, etc., or by leveraging other information to infer location information, e.g., where a mobile device is coupled to a femto-cell, then the femto-cell location information can be inferred to be the location of the mobile device, etc. Improved selection of sets of radio-to-mobile measurements for calibration, e.g., adaptive calibration, can allow calibration to be more efficient than attempting to calibrate all radio-to mobile measurements. As such, adaptive calibration can be desirable.

A NELOS can employ TFL technologies that can include location information or timing information as described herein and as disclosed in more detail in U.S. Ser. No. 12/712,424 filed Feb. 25, 2010, which application is hereby incorporated by reference in its entirety. TFL information can facilitate access to location information for a mobile device, e.g., a UE. TFL information can be information from systems in a timed fingerprint location wireless environment, such as a TFL component of a wireless telecommunications carrier. As a non-limiting example, UEs, including mobile devices not equipped with a GPS-type system, can be associated with TFL information, which can facilitate determining a location for a UE based on the timing information associated with the UE.

In an aspect, TFL information can include information to determine a differential value for a radio, e.g., a NodeB site pair, and a bin grid frame, as disclosed in more detail in incorporated U.S. Ser. No. 12/712,424. A centroid region (possible locations between any site pair) for an observed time value associated with any NodeB site pair (NBSP) can be calculated and can be related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can return, for example, a set of bin grid frame locations forming a hyperbola correlating to the radios of the NBSP. A second lookup can then be performed for an additional relevant NBSP, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, AGPS, triangulation or multilateration in wireless carrier environments, near field techniques, or proximity sensors.

NELOS can benefit by maintaining the calibration of the measurements disclosed in relation to TFL technologies, such as the observed time difference measurement. Where calibration does not remain accurate, location information resulting from TFL lookups can become inaccurate. Calibration of a NELOS can be associated with calibrating a substantial number of timing values for radio links with UEs. There can literally be millions of timing values for radio links with UEs that can be calibrated for typical wireless carrier networks in the U.S. Selective calibration can reduce the number of calibrations within a NELOS. Selective calibration, by way of adapting the radio links selected for calibration, can related to prioritizing calibration of the measurements for radio links with UEs based on a set of rules. These rules can allow for calibration of the measurements for radio links with UEs to calibrate measurements associated with key areas, calibrate measurements associated with greater observation density, calibrate measurements associated with less redundancy, or nearly any other criteria that can be deemed relevant. As such, adaptive calibration can reduce the total volume of calibrations attempted and correspondingly can reduce operating expenses for a NELOS.

FIG. 1 is an illustration of a system 100, which facilitates adaptive calibration in accordance with aspects of the subject disclosure. System 100 can include calibration component 110 that can facilitate determination of calibration information. Calibration component 110 can receive radio information. Radio information can include timing information for a radio link between a UE and a wireless carrier network radio. In an aspect, timing information can include a measurement of the propagation time between the radio and the UE. This type of information can generally be correlated with the distance between the UE and the radio given that electromagnetic energy travels at the speed of light, 'c', and therefore the time multiplied by c will yield the distance over which the electromagnetic signal traveled. In a further aspect, additional time can be consumed in the transmission of the electromagnetic signal by the radio itself, which additional time can typically be constant for a particular radio over a window of time and can be termed as 'radio delay time'. The radio delay time can be measured when the location of the radio and the location of a UE are both known because the ideal propagation time can be computed based on the distance between the radio and the UE and subtracted from the observed time for a real signal to propagate between the radio and the UE. As an example, it can generally be observed that (observed time=propagation time+radio delay time) and (propagation time=ideal propagation time=(1/c)*(distance between radio and UE)), therefore, (radio delay time=observed time−(1/c) *(distance between radio and UE)). Experimentally, many modern wireless network radios can be relatively stable for hours to days. Radio delay time can be employed in TFL location information determinations for a NELOS.

In an aspect, where radio delay time is stable, a timing measurement of a radio link with a UE can be employed to determine a distance between the radio and the UE. As an example, (distance=c*(propagation time−previously measured radio delay time)). However, where radio delay time is unstable, the determination of a distance between a radio and a UE can be subject to a corresponding error where it is based on a prior radio delay time measurement. Calibration of timing measurements, e.g., radio delay time, can reduce errors in determining TFL location information by predetermining radio delay time within sufficiently short windows of time such that changes in the radio delay time do not substantially affect the computations associated with TFL location information determination. As an example, where a radio is of a type known to have radio delay time radio delay sufficiently to affect TFL location information determination over a period of about 20 hours, the radio delay time can be recalibrated in shorter intervals, e.g., 8 hours, 10 hours, 14 hours, etc., to prevent the radio delay time measurement from aging to a point that it substantially impacts subsequent TFL location information determinations.

Calibration can be based on determining a distance between a radio and a UE and correlating that distance with a contemporaneously measured time for a signal over the same radio link. Given that the physical geographic location of wireless network carrier radios are typically well defined and that the timing information for a radio link can be extracted from typical radio traffic between a radio and a UE, if the location of the UE is known, then the radio delay time can be determined and updated to maintain calibration. Many modern UEs have access to location information or location can be inferred from other information associated with the UE. As an example, where a UE is Global Positioning System (GPS) enabled or Assisted GPS (AGPS) enabled, location information can be requested through the GPS or AGPS systems. As a further example, where a UE is coupled to a femto-cell, it can be inferred that the UE is within a certain distance of the femto-cell and the location of the femto-cell can be employed as a location substitute for the UE location. Numerous other location information techniques and technologies can be employed to identify the location of a UE for calibrating timing measurements and all such sources of location information are to be considered within the scope of the presently disclosed subject matter. Further, for clarity and brevity, any of these location information sources can be generally referred to as alternate location information (ALI) sources. Therefore, generally, ALI can be employed, in conjunction with contemporaneously measured radio link information, to determine calibration information in NELOS environments.

Calibration component 110 can further receive alternate location information (ALI) to facilitate determination of calibration information. The location of the UE can be determined from the ALI. The distance between the UE and a radio can then be determined because the location of the radio is known. The measured time for signal propagation on the radio link can be received in the radio information received. The ideal propagation time can be determined based on the determined distance between the radio and the UE. The difference between the measured propagation time and the ideal propagation time can then characterize delay associated with generating and propagating the signal over the radio link. This time difference can be employed be made available as calibration update information as depicted in system 100. It is to be noted that a window of time can be associated with the calibration update information that reflects an expected period wherein the real-world change in radio delay time is sufficiently stable so as to be useful in determining location information, e.g., by way of TFL technologies, before becoming aged or stale and becoming a candidate for a calibration update.

Updating calibration information for large sets of radios can be operationally intensive and selection of subsets of radios can significantly reduce operational investment. Adaptive calibration of measurements for a wireless radio network can prioritize calibration updates based on selection rules. As examples, a rule can designate that operational investment should not be made to update calibration for a measurement that has not met a threshold age value, that calibration should not be attempted where there is insufficient time to gather contemporaneous ALI for a UE, that calibration update priority should be given to radios that are most frequently visible to the greatest number of mobile subscribers, etc. Adaptive calibration rules can be included in calibration component 110 to facilitate calibration updates that meet predetermined criteria. It will be noted that rules relating to adaptive calibration can be based on nearly any metric or predefined criteria and are not limited to those listed herein.

Figure 2:
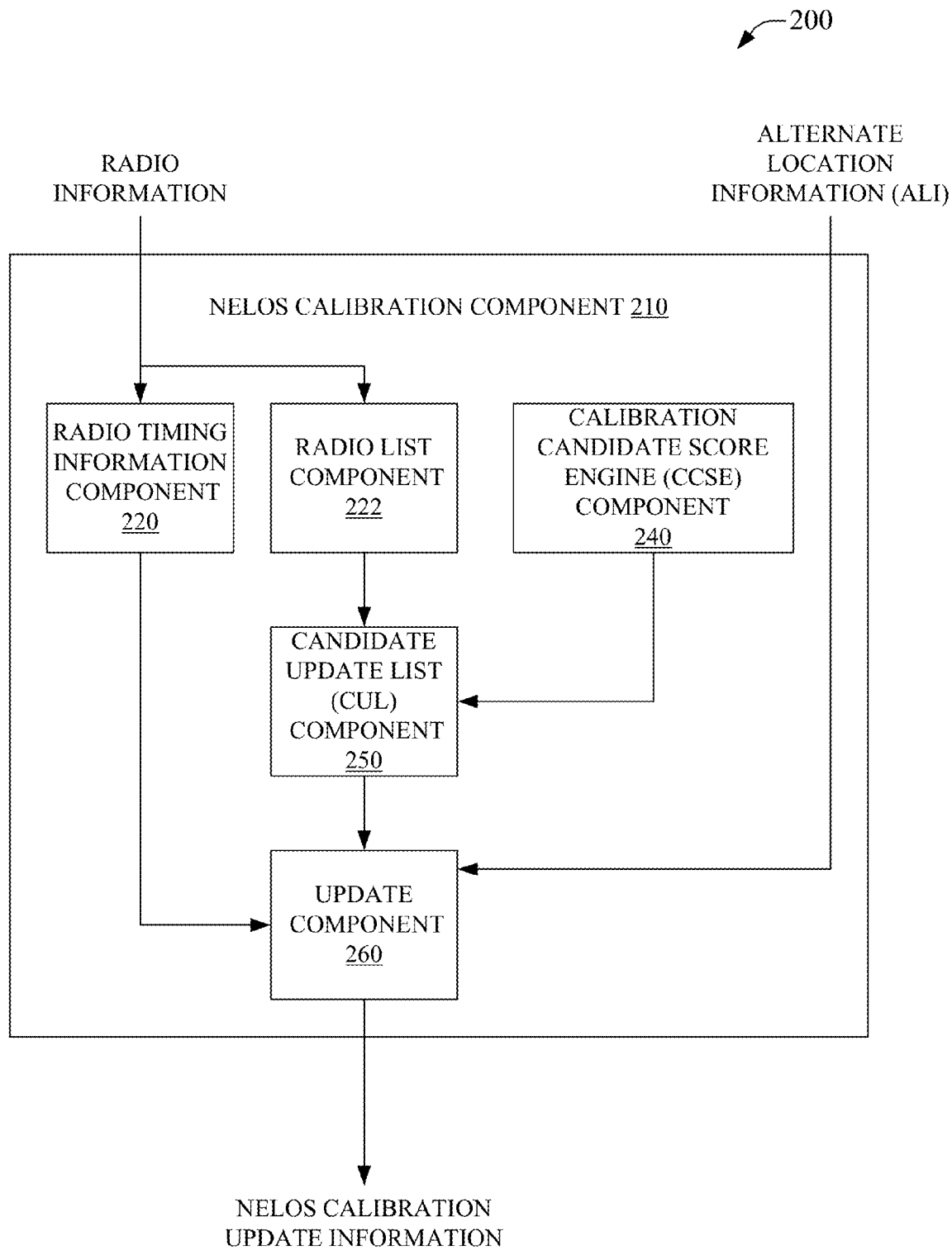
FIG. 2 is a depiction of a system that facilitates adaptive calibration for NELOS in accordance with aspects of the subject disclosure.

FIG. 2 is a depiction of a system 200 that can facilitate adaptive calibration for NELOS in accordance with aspects of the subject disclosure. System 200 can include NELOS calibration component 210 that can facilitate determination of calibration information. NELOS calibration component 210 can receive radio information. Radio information can include timing information for a radio link between a UE and a wireless carrier network radio. In an aspect, timing information can include a measurement of the propagation time between the radio and the UE. Radio information can further include radio identification information that can be correlated to the timing information. As an example, radio information can be received including timing information correlated to a plurality of identifiable radios allowing the timing information to be employed in determining calibration update information for one or more of the plurality of radios. As such, radio information can be received by radio timing information component 220, for extraction of timing information from the radio information, and can also be received by radio list component 222, for extraction of the correlated radio identification information. NELOS Calibration component 210 can further receive ALI to facilitate determination of calibration information. A location of a UE can be determined from ALI.

In an embodiment, NELOS calibration component 210 can access information relating to selection of calibration update candidates by way of calibration candidate score engine (CCSE) component 240. CCSE component 240 can prioritize or deprioritize select radios for calibration update based on one or more adaptive calibration rules. In some embodiments, CCSE component 240 can generate a set of calibration candidates including some, none, or all radios for a predetermined coverage scope. As an example, where the coverage scope is California, the set of calibration candidates can include some, none, or all of the radios associated with the wireless network in California. It will be noted that the predetermined scope can be of any level of granularity, e.g., a single radio, a portion of a city, a city, a county, a region of a state, a state, a region of a country, a country, an international region, etc. It will further be noted that the predetermined scope can include multiple areas, contiguous or not, e.g., a predetermined scope can be Oregon and California, Idaho and California, New York and Boston, etc. Still further, it will be noted that a predetermined coverage scope can include radios for one or more wireless network carriers or related entities, e.g., a predetermined scope can include radios for Carriers A and C in Boston but not Carrier B in Boston, etc.

NELOS calibration component 210 can further include candidate update list (CUL) component 250. CUL component 250 can be communicatively coupled to CCSE component 240. CUL component 250 can receive at least a part of a set of calibration candidates by way of CCSE component 240. Further, CUL component 250 can be communicatively coupled to radio list component 222 to receive at least a part of a list of radios for which radio timing information is being received as disclosed herein. CUL component 250 can determine a subset of calibration candidates based on the information received from radio list component 222 and CCSE component 240. As an example, where a set of calibration candidates is determined by, and received from, CCSE component 250, CUL component 250 can compare the set of calibration candidates against a list of radios received by way of radio list component 222 to determine the intersection of the set and the list, resulting in a candidate update list that includes, at least in part, those radios that are both in the calibration candidate set and in the list of radios for which timing information is available.

Update component 260 can be communicatively coupled to CUL component 250 and radio timing information component 220. Further, update component 260 can receive ALI, as illustrated for system 200. Update component 260 can receive a candidate update list by way of CUL component 250. This set of candidates for calibration updates can then employed in determining NELOS calibration update information based on radio timing information, e.g., observed timing, received by way of radio trimming information component 220, and ALI. NELOS calibration update information can include information to identify a radio and a calibration value that can be employed to update the timing information for the identified radio.

Figure 3:
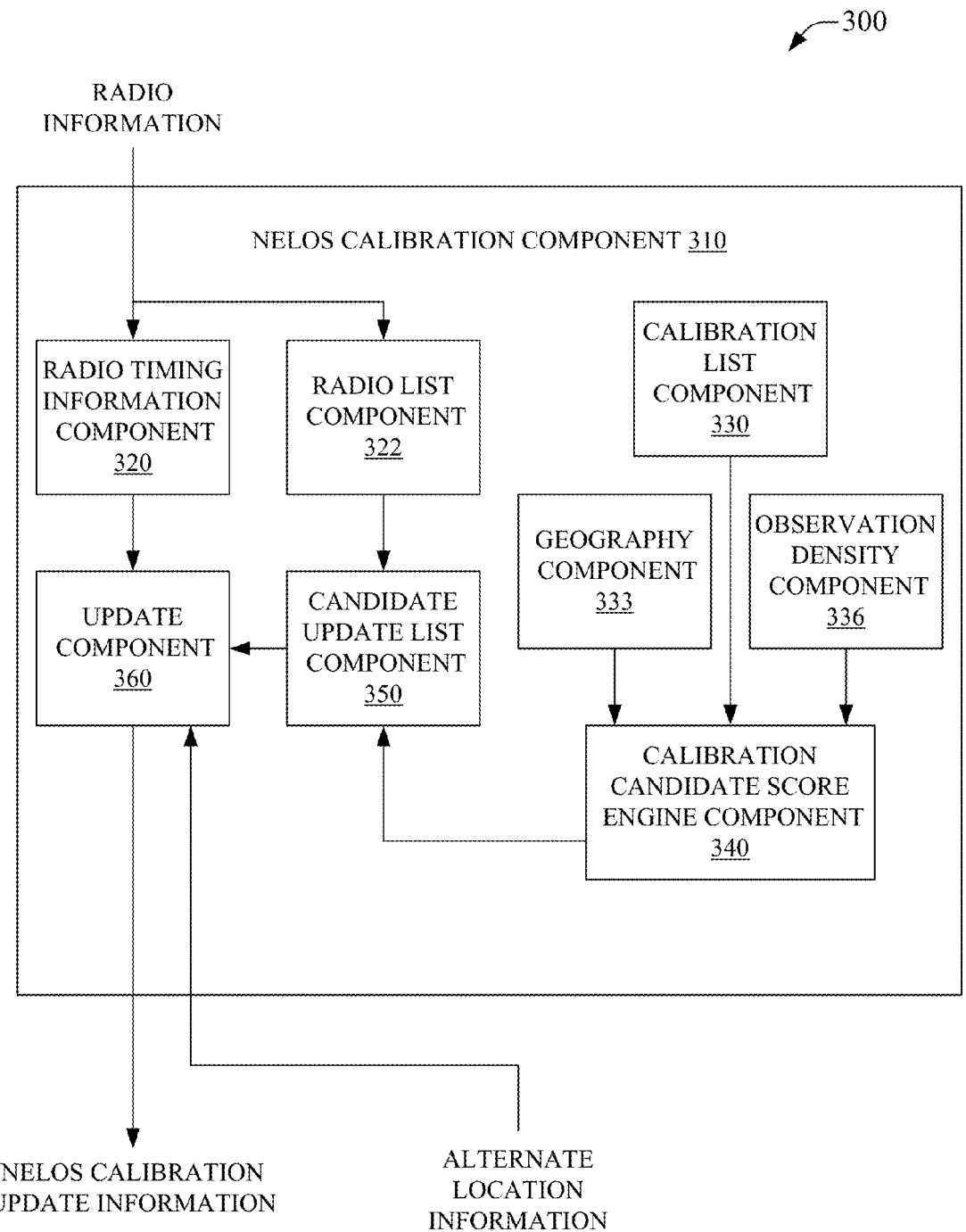
FIG. 3 illustrates a system that facilitates adaptive calibration for NELOS employing a select priority rule in accordance with the disclosed subject matter.

FIG. 3 illustrates a system 300 that facilitates adaptive calibration for NELOS employing a select priority rule in accordance with aspects of the subject disclosure. System 300 can include NELOS calibration component 310 that can facilitate determination of calibration information. NELOS calibration component 310 can receive radio information. Within NELOS calibration component 310, radio information can be received by radio timing information component 320 for extraction of timing information from the radio information. Timing information can be for a radio link between a UE and a wireless carrier network radio. In an aspect, timing information can include a measurement of the propagation time between the radio and the UE. Also within NELOS calibration component 310, radio information can be received by radio list component 322 for extraction of radio identification information. Radio identification information that can be correlated to the timing information. NELOS Calibration component 310 can further receive ALI to facilitate determination of calibration information. A location of a UE can be determined from ALI.

NELOS calibration component 310 can further include CCSE component 340 to prioritize or deprioritize radios for calibration updates based on one or more adaptive calibration rules. CCSE component 340 can be communicatively coupled to calibration list component 330. Calibration list component 330 can facilitate access to historical calibration information for potential candidates for calibration updates. Historical calibration information can include, for example, information identifying a radio, the calibration status of a radio, calibration age for a radio, etc. Further, calibration list component 330 can apply a rule to the historical calibration information. In an aspect, application of a rule to the historical calibration information can order the information, e.g., sorting by calibration status or calibration age, etc. In a further aspect, application of a rule to the historical calibration information can determine a ranking of the historical calibration information, e.g., prioritizing or deprioritizing calibration information based on a metric such as calibration status, calibration age, etc. CCSE component 340 can receive historical calibration information by way of calibration list component 330 and employ that information, at least in part, to prioritize or deprioritize radios for calibration updates.

CCSE component 340 can further be communicatively coupled to geography component 333. Geography component 333 can facilitate access to geographic information associated with potential candidates for calibration updates. Further, geography component 333 can apply a rule to the geographic information. In an aspect, application of a rule to the geographic information can order the information, e.g., sorting or ranking by geographic parameter, etc. As an example, geography component 333 can rank calibration candidates by coverage area overlap, such that radios with high levels of redundancy in coverage area are deprioritized in comparison to radios with low levels of redundancy in coverage area. As such, in this example, it can be a higher priority to update a radio calibration where there are fewer radios with overlapping coverage areas because there can be less likelihood of the radio calibration for the coverage area being updated by way of calibrating another radio with redundant coverage.

CCSE component 340 can also be communicatively coupled to observation density component 336. Observation density component 336 can facilitate access to observation density information associated with potential candidates for calibration updates. Observation density can include information on the level of visibility for a radio to UEs in a wireless carrier network. In an aspect, this can include information relating to the frequency with which UEs report receiving radio signals from a radio of a wireless carrier network. As an example, a first radio can be associated with 50,000 UE interactions per day, a second radio can be associated with 28,000 UE interactions per day, etc. Further, observation density component 336 can apply a rule to the observation density information. In an aspect, application of a rule to the observation density information can order the information, e.g., sorting or ranking by observation density parameter, etc. As an example, geography component 333 can rank calibration candidates by observation density parameter, e.g., from the previous example, a 50,000 interaction radio can be ranked higher than a 28,000 interaction radio because it can be considered to be more likely to have interactions in a given time period than the lower ranked radio.

NELOS calibration component 310 can further include CUL component 350. CUL component 350 can be communicatively coupled to CCSE component 340. CUL component 350 can receive at least a part of a set of calibration candidates by way of CCSE component 340. Further, CUL component 350 can be communicatively coupled to radio list component 322 to receive at least a part of a list of radios for which radio timing information is being received as disclosed herein. CUL component 350 can determine a subset of calibration candidates based on the information received from radio list component 322 and CCSE component 340. As an example, CCSE component 340 can facilitate access to a set of calibration candidates based, at least in part, on age of calibration, coverage area overlap, and frequency of interaction. CUL component 350 can then compare this exemplary candidate set to the list of radios, by way of radio list component 322, for which radio timing information is being received. CUL component 350 can facilitate access to a subset of the highest ranked calibration candidates, from the set received from CCSE component 340, that also have timing information being received.

Update component 360 can be communicatively coupled to CUL component 350 and radio timing information component 320. Further, update component 360 can receive ALI, as illustrated for system 300. Update component 360 can receive a candidate update list by way of CUL component 350. This candidate update list can be a subset of calibration candidates based on the list of radios for which timing information is being received. The candidate update list can then be employed in determining NELOS calibration update information based on radio timing information, e.g., observed timing, received by way of radio trimming information component 320, and ALI. NELOS calibration update information can include information to identify a radio and a calibration value that can be employed to update the timing information for the identified radio.

Figure 4:
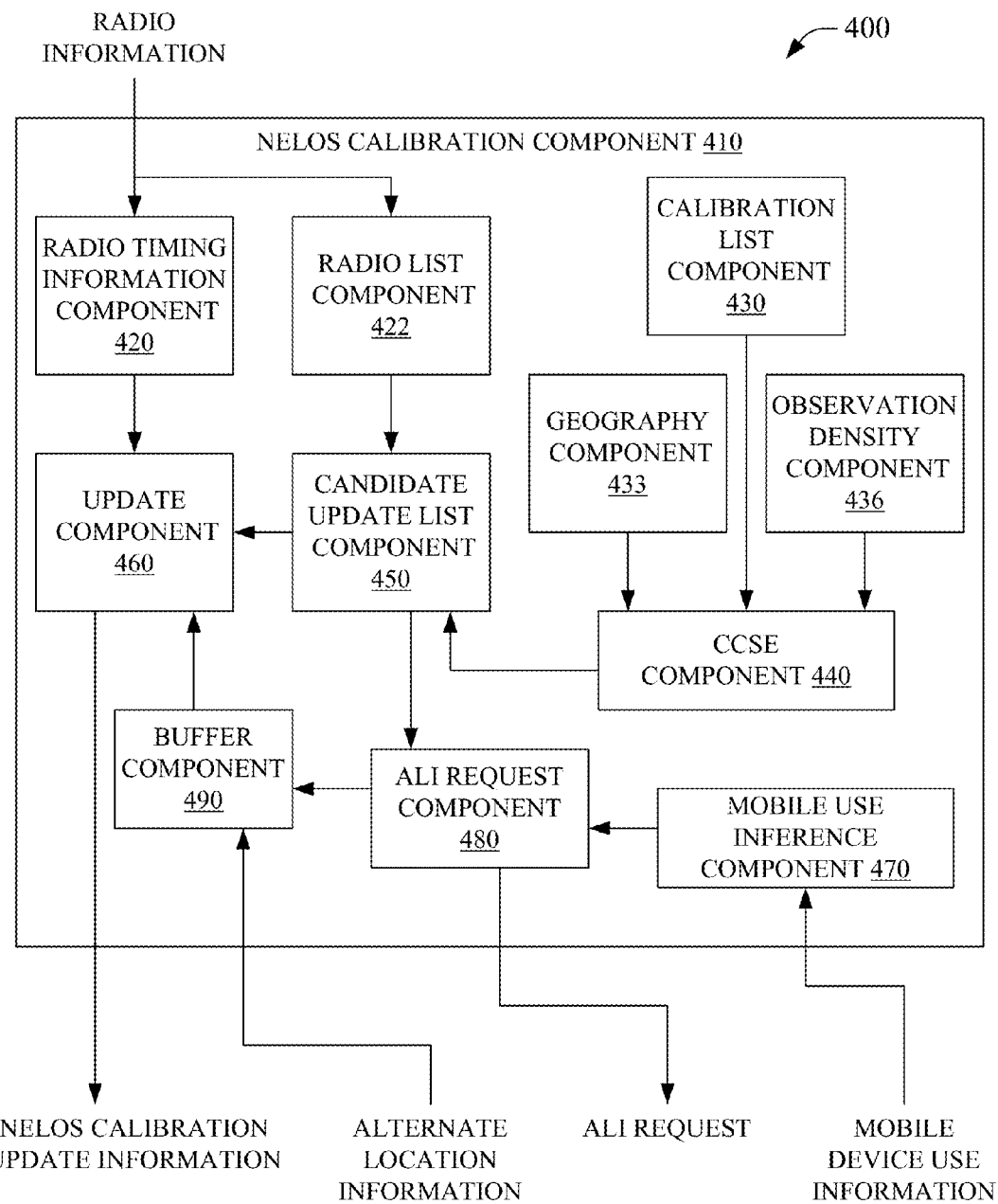
FIG. 4 is a depiction of a system that facilitates adaptive calibration for NELOS employing a select request rule in accordance with aspects of the subject disclosure.

FIG. 4 is a depiction of a system 400 that facilitates adaptive calibration for NELOS employing a select request rule in accordance with aspects of the subject disclosure. System 400 can include NELOS calibration component 410 that can facilitate determination of calibration information. NELOS calibration component 410 can receive radio information. The radio information can be received by radio timing information component 420 for extraction of timing information from the radio information. Timing information can be for a radio link between a UE and a wireless carrier network radio. In an aspect, timing information can include a measurement of the propagation time between the radio and the UE. Radio information can also be received by radio list component 422 for extraction of radio identification information. Radio identification information can be correlated to the timing information. NELOS Calibration component 410 can further receive ALI to facilitate determination of calibration information. A location of a UE can be determined from ALI.

NELOS calibration component 410 can further include CCSE component 440 to prioritize or deprioritize radios for calibration updates based on one or more adaptive calibration rules. CCSE component 440 can be communicatively coupled to calibration list component 430. Calibration list component 430 can facilitate access to historical calibration information for potential candidates for calibration updates. Further, calibration list component 430 can apply a rule to the historical calibration information. In an aspect, application of a rule to the historical calibration information can order the information. In a further aspect, application of a rule to the historical calibration information can determine a ranking of the historical calibration information. CCSE component 440 can receive historical calibration information by way of calibration list component 430 and employ that information, at least in part, to prioritize or deprioritize radios for calibration updates.

CCSE component 440 can further be communicatively coupled to geography component 433. Geography component 433 can facilitate access to geographic information associated with potential candidates for calibration updates. Further, geography component 433 can apply a rule to the geographic information. In an aspect, application of a rule to the geographic information can order the information. CCSE component 440 can receive geographic information by way of geography component 433 and employ that information, at least in part, to prioritize or deprioritize radios for calibration updates.

CCSE component 440 can also be communicatively coupled to observation density component 436. Observation density component 436 can facilitate access to observation density information associated with potential candidates for calibration updates. Observation density can include information on the level of visibility for a radio to UEs in a wireless carrier network. In an aspect, this can include information relating to the frequency with which UEs report receiving radio signals from a radio of a wireless carrier network. Further, observation density component 436 can apply a rule to the observation density information. In an aspect, application of a rule to the observation density information can order the information. CCSE component 440 can receive observation density information by way of observation density component 436 and employ that information, at least in part, to prioritize or deprioritize radios for calibration updates.

NELOS calibration component 410 can further include CUL component 450. CUL component 450 can be communicatively coupled to CCSE component 440. CUL component 450 can receive at least a part of a set of calibration candidates by way of CCSE component 440. Further, CUL component 450 can be communicatively coupled to radio list component 422 to receive at least a part of a list of radios for which radio timing information is being received as disclosed herein. CUL component 450 can determine a subset of calibration candidates based on the information received from radio list component 422 and CCSE component 440. CUL component 450 can then compare this exemplary candidate set to the list of radios, by way of radio list component 422, for which radio timing information is being received. CUL component 450 can facilitate access to a subset of the ranked calibration candidates, from the set received from CCSE component 440, that also have timing information being received.

Update component 460 can be communicatively coupled to CUL component 450 and radio timing information component 420. Further, update component 460 can be communicatively coupled to buffer component 490. Buffer component 490 can receive ALI in response to an ALI request. Buffer component 490 can queue ALI as it is received such that where an ALI request is generated but ALI information is incomplete, the associated radio can be identified and removed from the subset of calibration candidates at received by update component 460. An ALI request can result can typically result in receiving ALI from a UE, however, where an ALI request is communicated to a UE, the UE can go idle before the ALI information is returned to buffer component 490. As an example, where a UE receives an ALI request the UE can begin to determine alternate location information, e.g., by activating an AGPS system, etc. Where the exemplary UE moves out of the coverage area, goes into an idle state, is turned off, experiences radio interference, etc., the return of the ALI information in response to the ALI request can fail. Experimental data indicates that an exemplary AGPS can take about 21 seconds to return ALI, leaving sufficient time for intervening factors to disrupt the return of the ALI to buffer component 490.

Due to the relatively extended period of time that can be experienced between requesting ALI and receiving ALI, NELOS calibration component 410 can further include, mobile use inference component 470. Mobile use inference component 470 can form inferences relating to the use of a UE based in part on received mobile device use information. The inferences can further be based on rules relating to use patterns for one or more UEs. As an example, experimental data indicates that an average voice call with a UE lasts about 90 seconds. Based on this experimental data, a rule can cause an inference to be determined that when a voice call is initiated, as indicated by received mobile device use information, that there will be sufficient time to request AGPS ALI because AGPS requests are typically fulfilled in about 21 seconds. Expanding the example, if a UE profile indicates that voice calls from a particular UE typically last 20 minutes but calls received at that same UE typically last only 15 seconds, an inference can be formed that an AGPS ALI request should not be made when mobile device use information for that particular UE indicates an incoming call to the UE but that an AGPS ALI request can be made where the UE is making an outgoing call.

ALI request component 480 can receive inference information from mobile use inference component 470 and the subset of calibration candidates from CUL component 450. ALI request component 480 can generate an ALI request based in part on inference information and the subset of calibration candidates. As an example, an inference can indicate that an AGPS ALI can result in a favorable return of AGPS information, but the radio associated with the radio link to the UE to which the ALI request would be sent is not in the subset of calibration candidates and, as such, an ALI request is not generated. As a second example, an inference can indicate that an ALI request is likely to fail, e.g., there is insufficient time to receive ALI in response to the request, and an ALI request may not be generated even where the associated radio is part of the set of calibration candidates. In another example, an inference can indicate likely success and the associated radio can be in the set of calibration candidates which can result in an ALI request being sent and buffer component 490, which is communicatively coupled to ALI request component 480, can begin buffering ALI received in response to the ALI request. Where the exemplary ALI information is received, it can be made available to update component 460. Update component 460 can also receive a candidate update list by way of CUL component 450. This candidate update list can be a subset of calibration candidates based on the list of radios for which timing information is being received. The candidate update list can then be employed in determining NELOS calibration update information based on radio timing information, e.g., observed timing, received by way of radio trimming information component 420, and ALI from buffer component 490. NELOS calibration update information can include information to identify a radio and a calibration value that can be employed to update the timing information for the identified radio.

Figure 5:
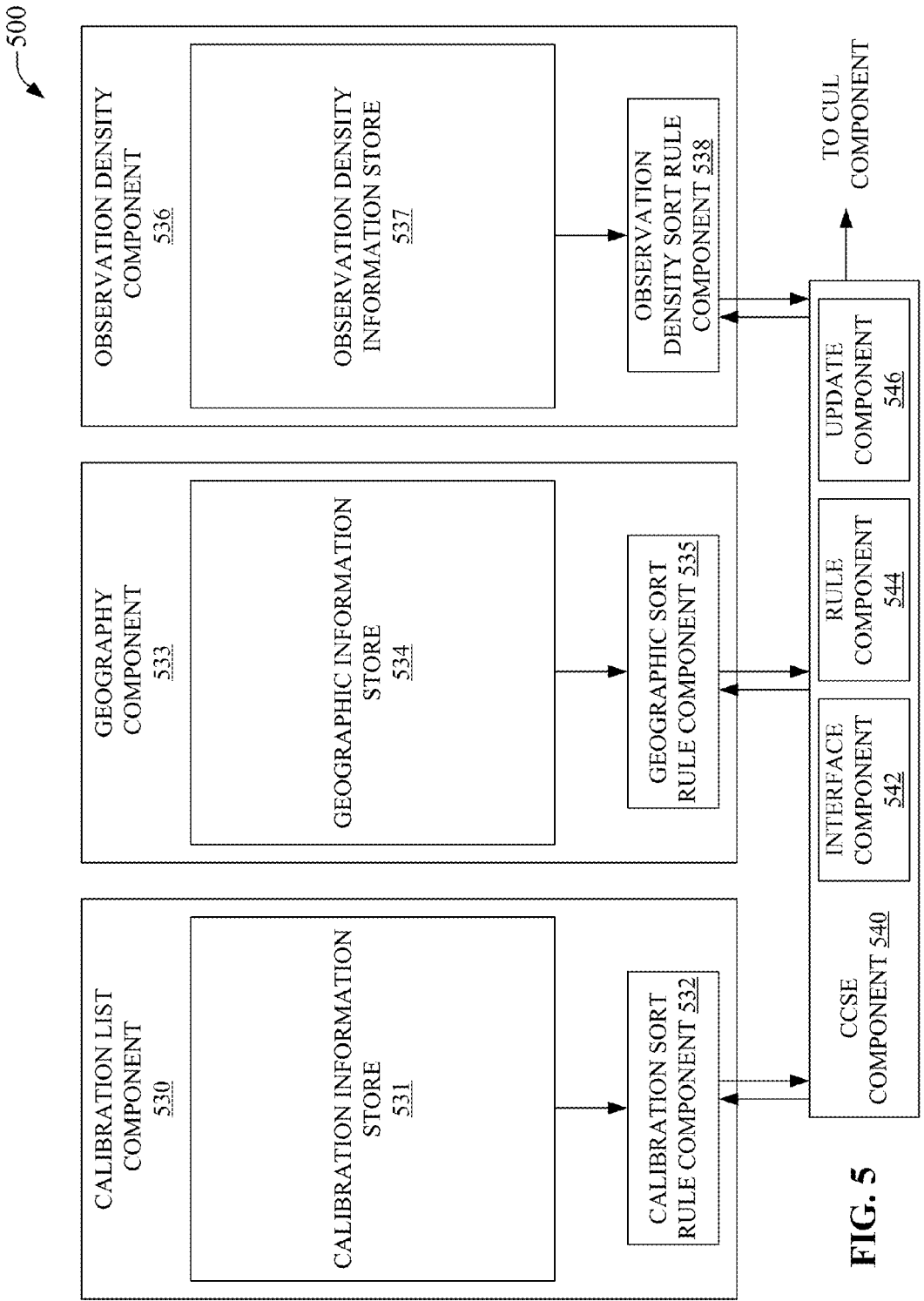
FIG. 5 is a depiction of a system that facilitates adaptive calibration for NELOS employing select priority rules in accordance with aspects of the subject disclosure.

FIG. 5 is a depiction of a system 500 that facilitates adaptive calibration for NELOS employing select priority rules in accordance with aspects of the subject disclosure. System 500 can include CCSE component 540 to prioritize or deprioritize radios for calibration updates based on one or more adaptive calibration rules. CCSE component 540 can be communicatively coupled to calibration list component 530. Calibration list component 530 can facilitate access to historical calibration information for potential candidates for calibration updates. Calibration list component 530 can include calibration information store 531 that can store historical calibration information. Further, calibration list component 530 can apply a rule to the historical calibration information. In an aspect, application of a rule to the historical calibration information can order the information. In a further aspect, calibration list component 530 can include calibration sort rule component 532 that can facilitate application of a rule to the historical calibration information to determine a ranking of the historical calibration information. CCSE component 540 can receive historical calibration information by way of calibration list component 530 and employ that information, at least in part, to prioritize or deprioritize radios for calibration updates.

CCSE component 540 can further be communicatively coupled to geography component 533. Geography component 533 can facilitate access to geographic information associated with potential candidates for calibration updates. In an aspect, geography component 533 can include geographic information store 534 that can store geographic information. Further, geography component 533 can apply a rule to the geographic information. Geography component 533 can further include geographic sort rule component 535 that can facilitate application of a rule to sorting or ranking of geographic information. In an aspect, application of a rule to the geographic information can order the information. CCSE component 540 can receive geographic information by way of geography component 533 and employ that information, at least in part, to prioritize or deprioritize radios for calibration updates.

CCSE component 540 can also be communicatively coupled to observation density component 536. Observation density component 536 can facilitate access to observation density information associated with potential candidates for calibration updates. In an aspect, observation density component 536 can include observation density information store 537 that can store observation density information. Observation density information can include information related to the level of visibility for a radio to UEs in a wireless carrier network. In an aspect, this can include information relating to the frequency with which UEs report receiving radio signals from a radio of a wireless carrier network. Further, observation density component 536 can apply a rule to the observation density information. Observation density component 536 can further include observation density sort rule component 538 that can facilitate application of a rule to sorting or ranking of observation density information. In an aspect, application of a rule to the observation density information can order the information. CCSE component 540 can receive observation density information by way of observation density component 536 and employ that information, at least in part, to prioritize or deprioritize radios for calibration updates.

CCSE component 540 can further include interface component 542 that can facilitate interaction with other components of system 500 that can facilitate prioritization or deprioritization of radios for calibration updates, e.g., in addition to, or in lieu of, calibration list component 530, geography component 533, and/or observation density component 536. CCSE component 540 can additionally include rule component 544 that can receive a rule facilitating prioritization or deprioritization of radios for calibration updates. In an aspect, a rule received at rule component 544 can be pushed out to communicatively coupled components such as calibration list component 530, geography component 533, and/or observation density component 536. In a further aspect, a rule received at rule component 544 can be applied directly to prioritization or deprioritization of radios for calibration updates at the CCSE component 540 level. In another aspect, a rule received at rule component 544 can be employed to the interaction with communicatively coupled components such as calibration list component 530, geography component 533, and/or observation density component 536, to adapt the interaction of the information received from said components as related to prioritization or deprioritization of radios for calibration updates. Moreover, CCSE component 540 can include update component 546 that can facilitate updating of rule component 544.

Figure 6:
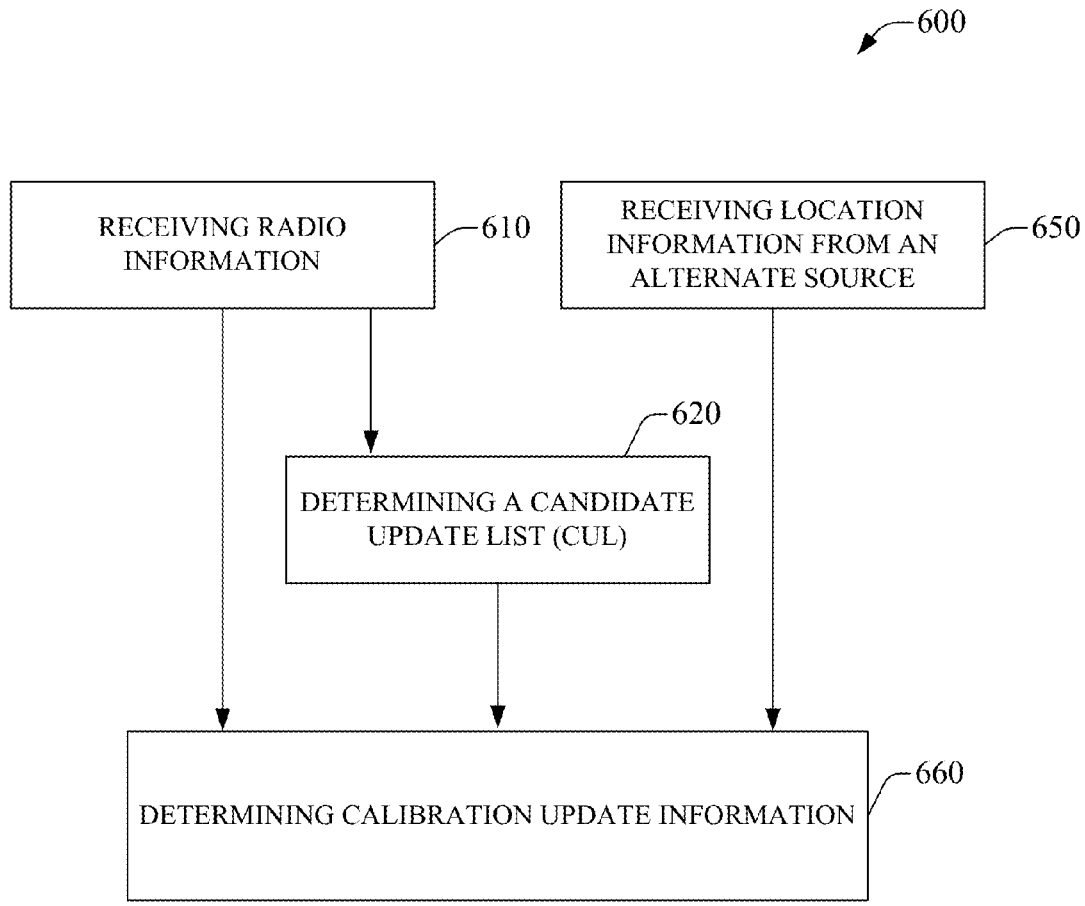
FIG. 6 illustrates a method facilitating adaptive calibration in accordance with aspects of the subject disclosure.
Figure 7:
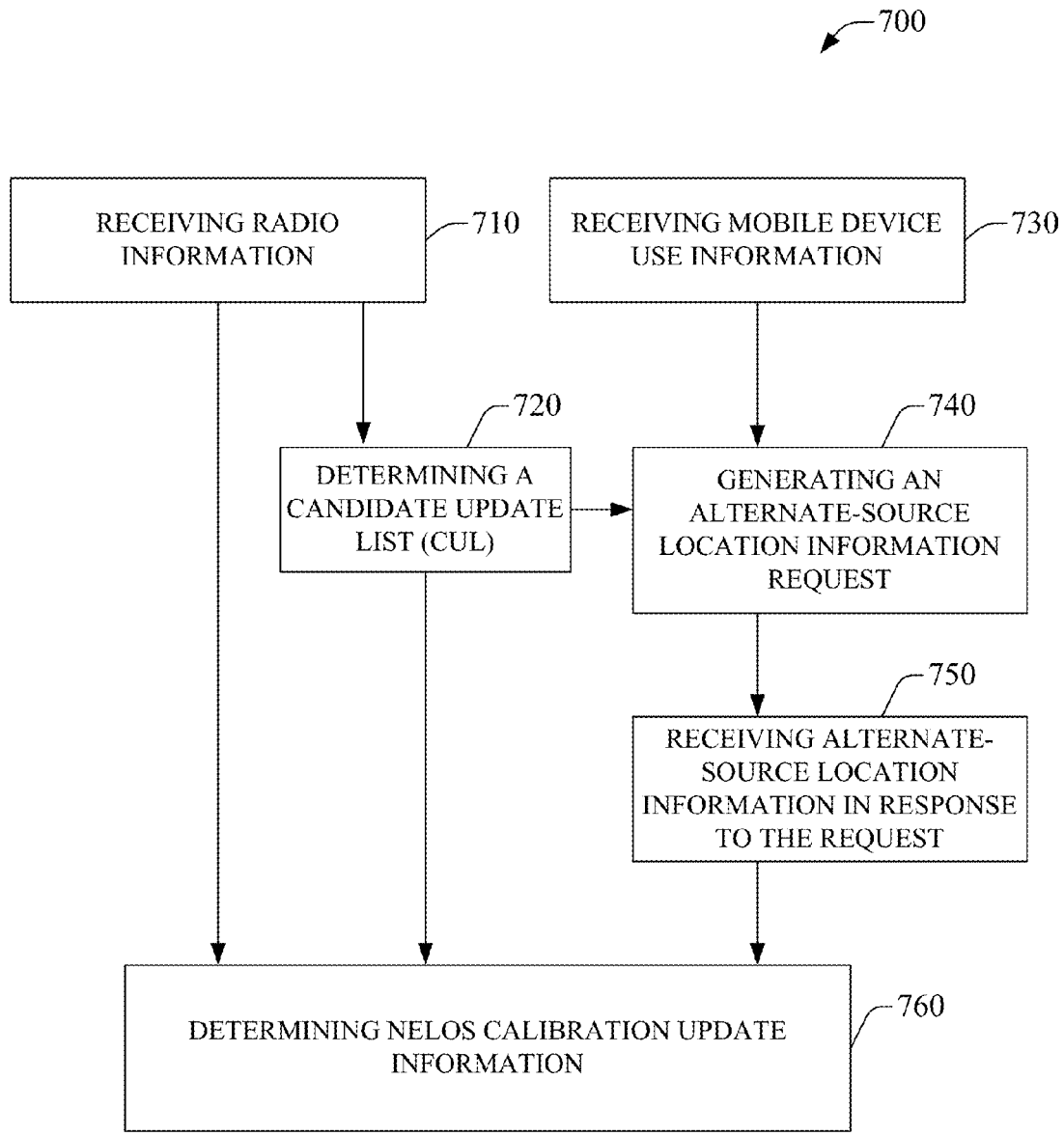
FIG. 7 illustrates a method for facilitating adaptive calibration for NELOS in accordance with aspects of the subject disclosure.
Figure 8:
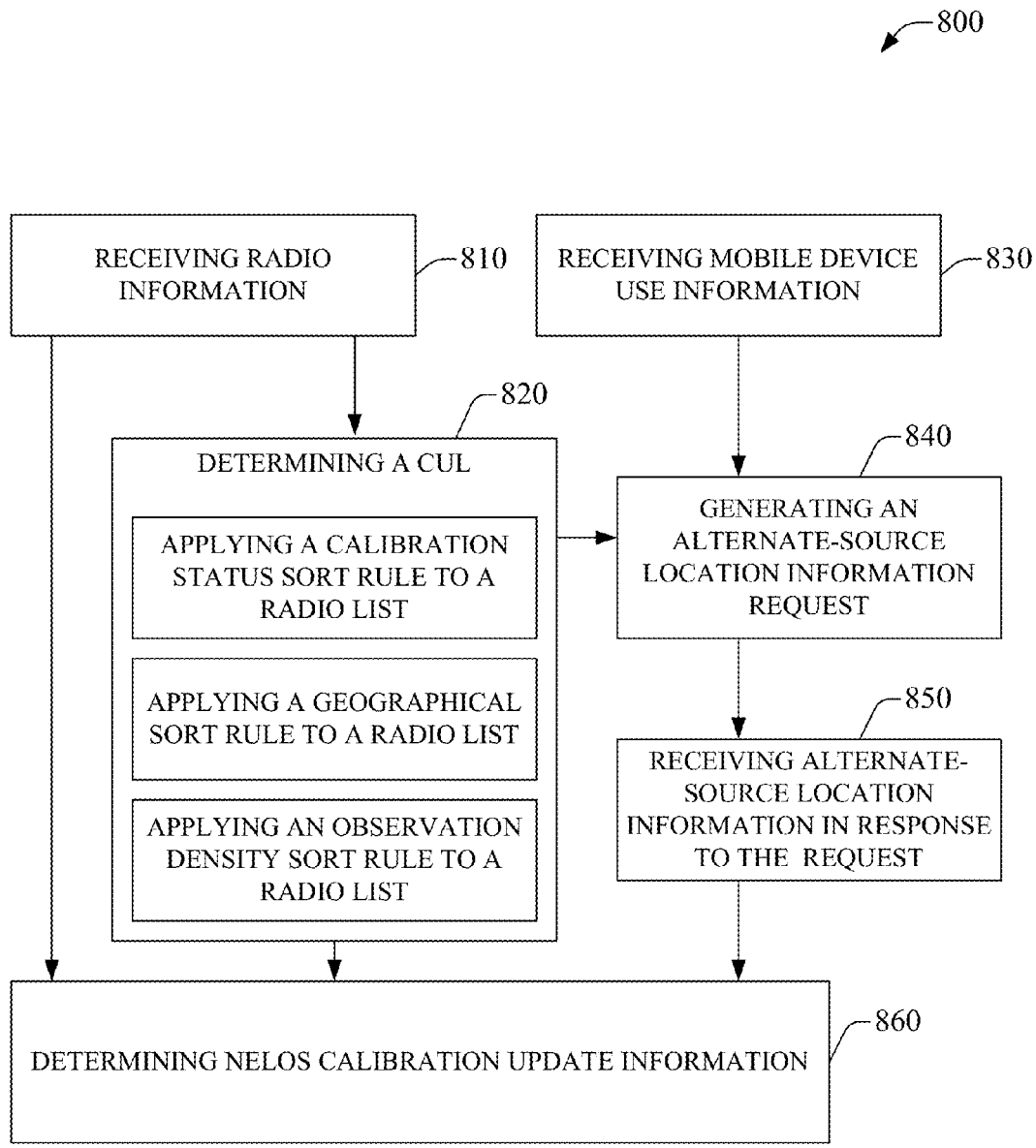
FIG. 8 illustrates a method for facilitating adaptive calibration for NELOS employing a select priority rule and a select request rule in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating adaptive calibration in accordance with aspects of the subject disclosure. At 610, radio information can be received. Radio information can include timing information for a radio link between a UE and a wireless carrier network radio. In an aspect, timing information can include a measurement of the propagation time between the radio and the UE. Radio information can further include radio identification information that can be correlated to the timing information.

At 620, a candidate update list (CUL) can be determined. Determining the CUL can be based, at least in part, on the radio information received at 610. The CUL can also be based in part on set of calibration candidates including some, none, or all radios for a predetermined coverage scope. In an aspect, the CUL can be the subset of radios that are in both the set of calibration candidates and in the radio information received at 610. As such, the CUL includes radios that are prioritized for calibration, as evidenced by their inclusion in the set of calibration candidates, and that are also represented in the radio information being received.

At 650, location information from an alternate source can be received. The location information received at 650 can be ALI as disclosed hereinabove. In an embodiment, the location of a UE can be determined from the ALI directly. The distance between the UE and a radio can then be determined because the location of the radio is known to a wireless network carrier. The measured time for signal propagation on the radio link can be received as part of the radio information received at 610. Thus, at 660, calibration update information can be determined based on the radio information at 610, the ALI received at 650, and the CUL determined at 620. At this point, method 600 can end. An ideal propagation time can be determined for a radio on the CUL, e.g., from 620, based on determining a distance between the radio and the UE, e.g., difference between ALI location of the UE and known location of the radio. The difference between the measured propagation time from the radio information received at 610 and an ideal propagation time based on the determined distance between the UE and radio can then characterize delay associated with generating and propagating the signal over the radio link. This time difference can be employed be made available as calibration update information. Calibration update information can be employed in updating calibration values for a NELOS.

FIG. 7 illustrates a method 700 that facilitates adaptive calibration for NELOS in accordance with aspects of the subject disclosure. At 710, radio information can be received. Radio information can include timing information for a radio link between a UE and a wireless carrier network radio. In an aspect, timing information can include a measurement of the propagation time between the radio and the UE. Radio information can further include radio identification information that can be correlated to the timing information.

At 720, a CUL can be determined. Determining the CUL can be based, at least in part, on the radio information received at 710. The CUL can also be based in part on set of calibration candidates including some, none, or all radios for a predetermined coverage scope. In an aspect, the CUL can be the subset of radios that are in both the set of calibration candidates and in the radio information received at 710. As such, the CUL includes radios that are prioritized for calibration, as evidenced by their inclusion in the set of calibration candidates, and that are also represented in the radio information being received.

At 730, mobile device use information can be received. Mobile device use information can indicate how a UE is being used, e.g., voice, data, active, idle, relevant radios, etc. At 740, an alternate-source location information request can be generated based on the received mobile device use information and the radio associated with a radio link with the UE being on the CUL determined at 720. In an aspect, the alternate-source location information request can be a request for ALI. Further, in an embodiment, mobile device use information can be employed to form inferences relating to the use of the UE. As an example, an inference can be related to typical use time and employed in determining that the feasibility of requesting alternate-source location information.

At 750, alternate-source location information, e.g., ALI, can be received in response to the request generated at 740. The alternate-source location information received at 750 can be employed in determining the location of the UE associated with the request at 740. The distance between the UE and the radio associated with the radio link can then be determined because the location of the radio is known to a wireless network carrier. The measured time for signal propagation on the radio link can be received as part of the radio information received at 710. Thus, at 760, calibration update information can be determined based on the radio information at 710, the alternate-source location information received at 750, and the CUL determined at 720. At this point, method 700 can end. An ideal propagation time can be determined for a radio on the CUL, e.g., from 720, based on determining a distance between the radio and the UE, e.g., difference between alternate-source location information location of the UE and known location of the radio. The difference between the measured propagation time from the radio information received at 710 and an ideal propagation time based on the determined distance between the UE and radio can then characterize delay associated with generating and propagating the signal over the radio link. This time difference can be employed be made available as calibration update information. Calibration update information can be employed in updating calibration values for a NELOS.

FIG. 8 illustrates a method 800 that facilitates adaptive calibration for NELOS employing a select priority rule and a select request rule in accordance with aspects of the subject disclosure. At 810, radio information can be received. Radio information can include timing information for a radio link between a UE and a wireless carrier network radio. In an aspect, timing information can include a measurement of the propagation time between the radio and the UE. Radio information can further include radio identification information that can be correlated to the timing information.

At 820, a CUL can be determined. Determining the CUL can be based, at least in part, on the radio information received at 810. The CUL can also be based in part on set of calibration candidates including some, none, or all radios for a predetermined coverage scope. In an aspect, the CUL can be the subset of radios that are in both the set of calibration candidates and in the radio information received at 810. As such, the CUL can include radios that are prioritized for calibration, as evidenced by their inclusion in the set of calibration candidates, and that are also represented in the radio information being received.

In an aspect, determining a CUL can include applying a calibration status sort rule to a radio list. Calibration status can include historical calibration information for the set of calibration candidates. Historical calibration information can include, for example, information identifying a radio, a calibration status of a radio, a calibration age for a radio, etc. In an embodiment, applying a rule to the historical calibration information can order the historical calibration information. In an aspect, applying the rule to the historical calibration information can determine a ranking of the historical calibration information. The sorted or ranked historical calibration information can be used in prioritizing or deprioritizing radios for calibration updates.

In a further aspect, determining a CUL can include accessing geographic information associated with the set of calibration candidates. Applying a sorting rule to the geographic information can facilitate prioritizing or deprioritizing radios for calibration updates. In an aspect, applying of a rule to the geographic information can order the information based on geographic characteristics. As an example, higher ranking can be applied to a radio by applying a rule related to minimizing coverage area overlap for a radio.

In another aspect, determining a CUL can include accessing observation density information. Observation density can include information on the level of visibility for a radio to UEs in a wireless carrier network. In an aspect, this can include information relating to the frequency with which UEs report receiving radio signals from a radio of a wireless carrier network. Accessing observation density information can facilitate applying a rule to the observation density information. In an aspect, applying a rule to the observation density information can facilitate ordering or ranking the information to prioritize or deprioritize radios for calibration updates.

At 830, mobile device use information can be received. Mobile device use information can indicate how a UE is being used, e.g., voice, data, active, idle, relevant radios, etc. At 840, an alternate-source location information request can be generated based on the received mobile device use information and the radio associated with a radio link with the UE being on the CUL determined at 820. In an aspect, the alternate-source location information request can be a request for ALI. Further, in an embodiment, mobile device use information can be employed to form inferences relating to the use of the UE. As an example, an inference can be related to typical use time and employed in determining that the feasibility of requesting alternate-source location information.

At 850, alternate-source location information, e.g., ALI, can be received in response to the request generated at 840. The alternate-source location information received at 850 can be employed in determining the location of the UE associated with the request at 840. The distance between the UE and the radio associated with the radio link can then be determined because the location of the radio is known to a wireless network carrier. The measured time for signal propagation on the radio link can be received as part of the radio information received at 810. Thus, at 860, calibration update information can be determined based on the radio information at 810, the alternate-source location information received at 850, and the CUL determined at 820. At this point, method 800 can end. An ideal propagation time can be determined for a radio on the CUL, e.g., from 820, based on determining a distance between the radio and the UE, e.g., difference between alternate-source location information location of the UE and known location of the radio. The difference between the measured propagation time from the radio information received at 810 and an ideal propagation time based on the determined distance between the UE and radio can then characterize delay associated with generating and propagating the signal over the radio link. This time difference can be employed be made available as calibration update information. Calibration update information can be employed in updating calibration values for a NELOS.

Figure 9:
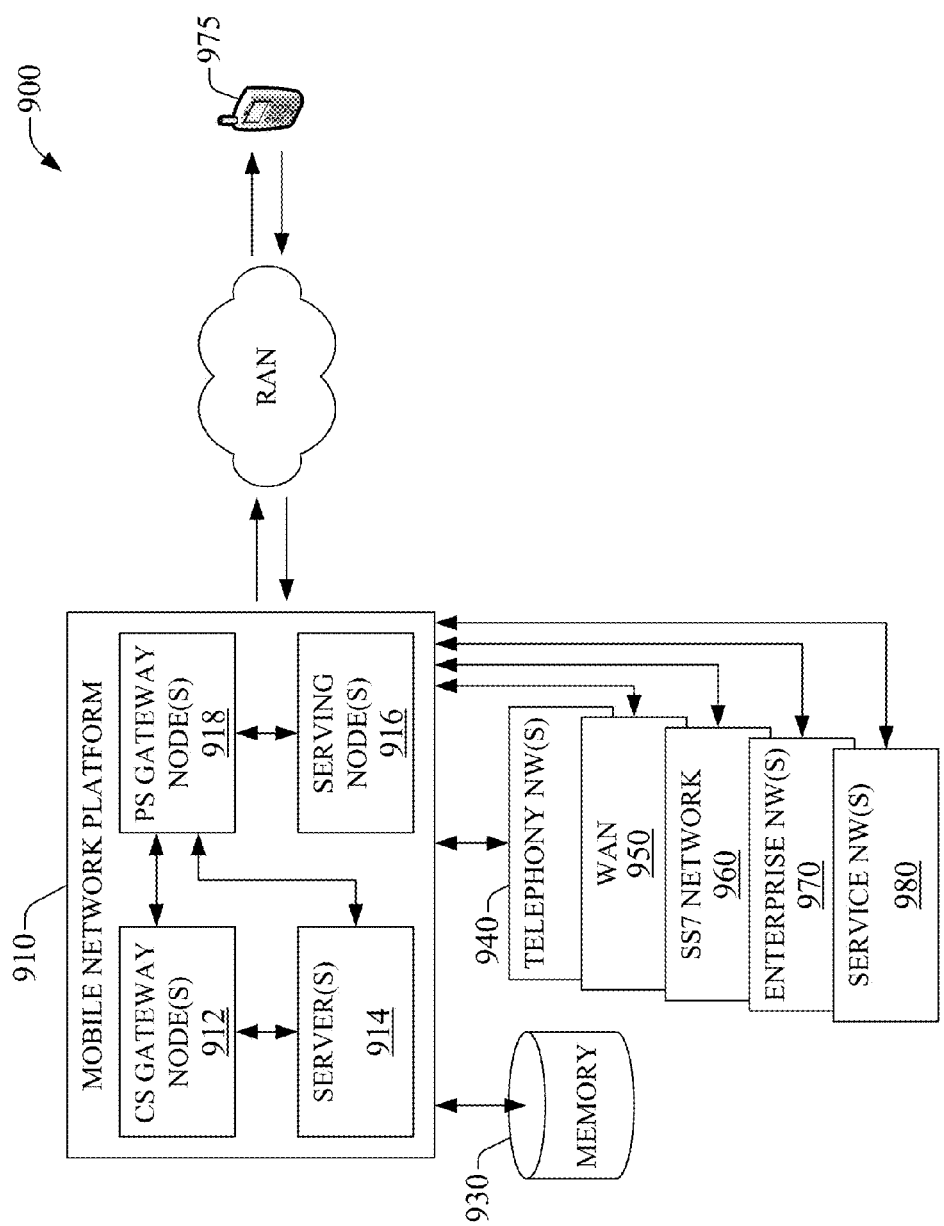
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
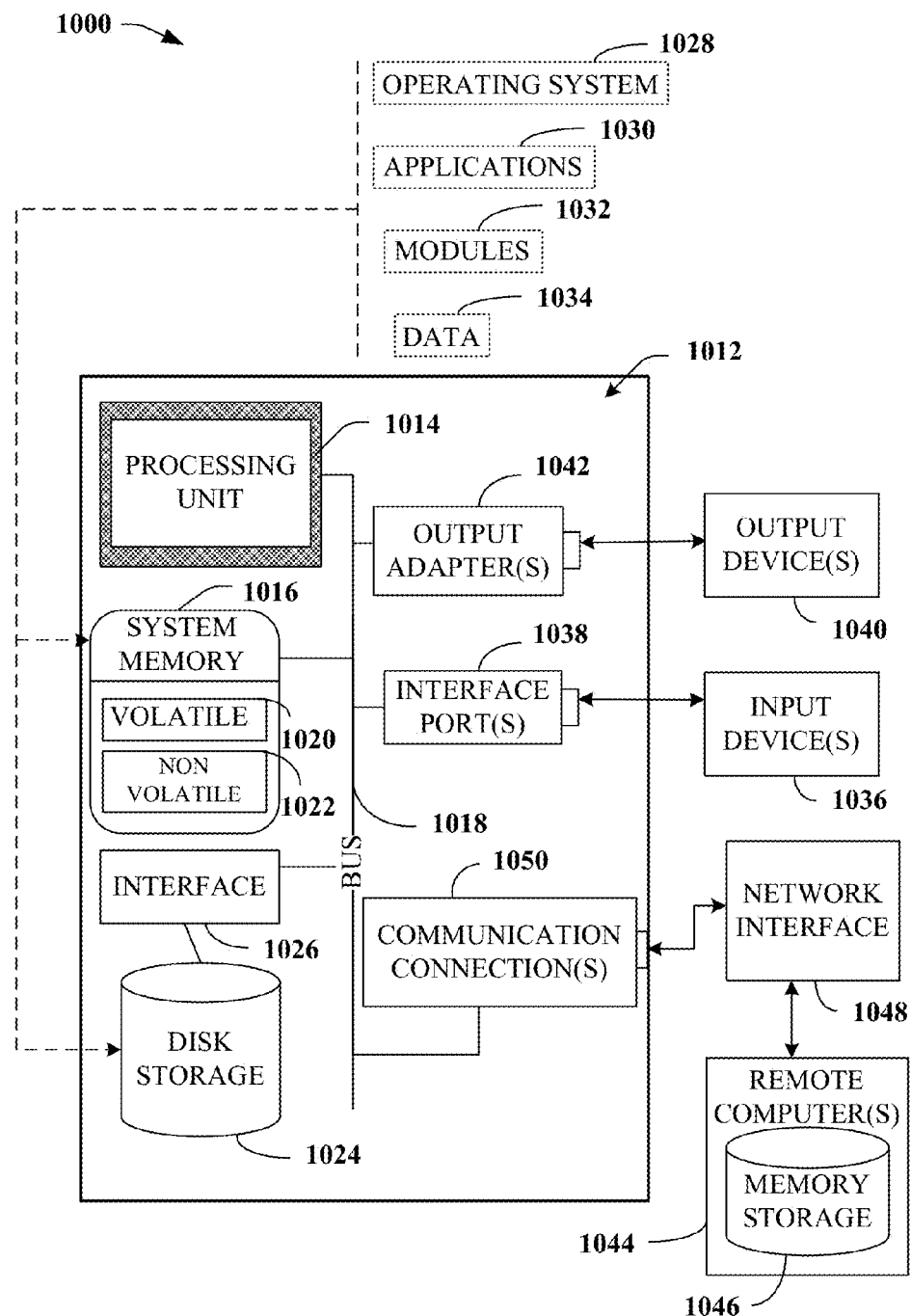
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of a mobile reporting component or UE (e.g., component 110, 210, 310, 410, etc.), a RAN component, a response component, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile reporting component 250 can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "radio," "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," "carrier network," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store executable instructions; and
a processor, coupled to the memory, that facilitates execution of the executable instructions to perform operations, comprising:
determining calibration update information related to a time measurement for a radio link between a wireless network radio and a user equipment based at least in part on radio information and alternate location information, wherein the alternate location information comprises location information determined from non-timed fingerprint location technologies; and
determining a set of calibration candidates, wherein the set of calibration candidates comprises a radio identification for a calibration candidate of the set of calibration candidates and a calibration score associated with the radio identification, and wherein the calibration score is employable to rank, by calibration priority, the calibration candidate in relation to the wireless network radio.

2. The system of claim 1, wherein the time measurement is an observed time difference measurement.

3. The system of claim 1, wherein the radio information includes an observed time measurement comprising a propagation time for the radio link and a radio delay time.

4. The system of claim 1, wherein the alternate location information includes location information determined from a global positioning system technology.

5. The system of claim 1, wherein the alternate location information includes location information determined from user equipment interaction with objects having a known location.

6. The system of claim 1, wherein the calibration score is based on historical calibration information associated with the calibration candidate.

7. The system of claim 6, wherein the historical calibration information is a historical calibration status.

8. The system of claim 6, wherein the historical calibration information is based on a time of a historical calibration of the calibration candidate.

9. The system of claim 1, wherein the calibration score is based on geographic information associated with the calibration candidate.

10. The system of claim 9, wherein the geographic information is a value correlating to overlap between an area of radio coverage for the calibration candidate and another wireless network radio other than the wireless network radio.

11. The system of claim 1, wherein the calibration score is based on observation density information including a frequency of interaction for the calibration candidate with another user equipment of the wireless network, and the observation density information is associated with the calibration candidate.

12. The system of claim 1, wherein the operations further comprise deprioritizing the wireless network radio from a current priority based on a determination that the alternate location information is compromised.

13. The system of claim 12, wherein the determination that the alternate location information is compromised is based on a probability that the alternate location information will be incomplete or unavailable for the wireless network radio.

14. A method, comprising:
receiving, by a system including a processor, radio information and alternate location information;
determining, by the system, calibration update information related to a time measurement for a radio link between a wireless network radio and a user equipment based at least in part on the radio information and the alternate location information, wherein the alternate location information comprises location information determined from non-timed fingerprint location technologies; and determining a set of calibration candidates, wherein the set of calibration candidates comprises a radio identification for a calibration candidate of the set of calibration candidates and a calibration score associated with the radio identification, and wherein the calibration score is employable to rank, by calibration priority, the calibration candidate in relation to the wireless network radio.

15. The method of claim 14, wherein the determining includes determining the calibration update information related to an observed time difference measurement, and the radio information comprises an observed time measurement comprising a propagation time for the radio link and a radio delay time.

16. The method of claim 14, wherein the determining the set of calibration candidates comprises receiving the calibration score, the calibration score is based on observation density information comprising a frequency of interaction for the calibration candidate with another user equipment of the wireless network, and the observation density information is associated with the calibration candidate.

17. The method of claim 14, wherein the determining the set of calibration candidates is based on historical calibration information associated with the calibration candidate, geographic information associated with the calibration candidate, and observation density information associated with the calibration candidate.

18. A mobile device, comprising:
a memory to store executable instructions; and
a processor, coupled to the memory, that facilitates execution of the executable instructions to perform operations, comprising:
determining calibration update information related to a time measurement for a radio link between a wireless network radio and a user equipment based at least in part on radio information and alternate location information, wherein the alternate location information comprises location information determined from non-timed fingerprint location technologies; and
determining a set of calibration candidates, wherein the set of calibration candidates includes a radio identification for a calibration candidate of the set of calibration candidates and a calibration score associated with the radio identification, wherein the calibration score is employable to rank, by calibration priority, the calibration candidate in relation to the wireless network radio.

19. The mobile device of claim 18, wherein the calibration score is based on observation density information comprising a frequency of interaction for the calibration candidate with another user equipment of the wireless network, and the observation density information is associated with the calibration candidate.

20. The mobile device of claim 18, wherein the determining the set of calibration candidates is based on historical calibration information associated with the calibration candidate, geographic information associated with the calibration candidate, and observation density information associated with the calibration candidate.

* * * * *